United States Patent [19]

Mikkelsen

[11] Patent Number: 5,103,716

[45] Date of Patent: Apr. 14, 1992

[54] APPARATUS FOR BREWING BEVERAGES IN PORTIONS, ESPECIALLY ESPRESSOR COFFEE

[75] Inventor: Per W. Mikkelsen, Odense SV, Denmark

[73] Assignee: Wittenborg A/S, Odense C, Denmark

[21] Appl. No.: 583,861

[22] Filed: Sep. 17, 1990

[30] Foreign Application Priority Data

Sep. 21, 1989 [DK] Denmark .............................. 4664/89

[51] Int. Cl.$^5$ ............................................. A47J 31/36
[52] U.S. Cl. ....................... 99/289 R; 99/289 T; 99/302 R; 99/302 P
[58] Field of Search ................. 99/289, 289 R, 289 O, 99/289 P, 302 R, 302 P, 295; 426/433

[56] References Cited

U.S. PATENT DOCUMENTS

| 2,715,868 | 11/1951 | Brown | 426/433 |
| 3,349,690 | 10/1964 | Heier | 99/302 R |
| 4,188,863 | 2/1980 | Grossi | 99/289 R |
| 4,506,596 | 3/1985 | Shigenobu et al. | 99/289 T |
| 4,784,050 | 11/1988 | Cavalli et al. | 99/289 R |
| 4,797,296 | 1/1989 | Meier et al. | 426/433 |
| 4,885,986 | 12/1989 | Grossi | 99/302 P |

FOREIGN PATENT DOCUMENTS

| 0125215 | 11/1984 | European Pat. Off. | 99/289 R |
| 2143206 | 8/1971 | Fed. Rep. of Germany . | |
| 2439417 | 5/1978 | Fed. Rep. of Germany . | |

Primary Examiner—Timothy F. Simone
Assistant Examiner—Reginald L. Alexander
Attorney, Agent, or Firm—Ladas & Parry

[57] ABSTRACT

An apparatus for brewing beverages in portions, especially espresso coffee, comprises means (9-12) for dispensing ground coffee beans (14) to a coffee receiving means (1) as well as water feeding means (22, 42-45) for passing hot water through the coffee in the coffee receiving means (1) and further to a cup (48). The coffee receiving means (1) comprises a sleeve-shaped body (3) made of a resilient material, said body on the outside being supported by a substantially rigid supporting means (4) and on the inside between the ends being of a volume exceeding the measured amount of coffee powder (14). The water feeding means (22, 42-45) comprises a piston device (22), which during the feeding of water is adapted to simultaneously compress both the measured amount of coffee (14) and the sleeve-shaped body (3) in its axial direction, while the amount of coffee (14) and the sleeve-shaped body (3) at the opposite axial end are supported by a sieving means (17, 18) allowing passage of the brewed hot beverage.

13 Claims, 5 Drawing Sheets

APPARATUS FOR BREWING BEVERAGES IN PORTIONS, ESPECIALLY ESPRESSOR COFFEE

FIELD OF THE INVENTION

The invention relates to an apparatus for brewing beverages in portions, especially espresso coffee and preferably for use in vending machines, said apparatus comprising means for dispensing a measured amount of ground coffee beans to a coffee receiving means as well as water feeding means combined with a piston device for compressing the coffee while hot water is simultaneously passing through the coffee in the coffee receiving means, the ready beverage being fed to a cup.

BACKGROUND ART

Apparatuses for brewing espresso coffee in portions are known in which hot water is pressed through an already compressed "cake" of ground coffee beans by means of a pressure of 6 to 12 bar. Such apparatuses require, however, relatively much space and are encumbered with problems concerning a complete removal of the compressed coffee from the coffee receiving means in question.

SUMMARY OF THE INVENTION

The object of the invention is therefore to provide an apparatus which is relatively simple and does not require much space, and which at the same time allows an easy removal of the used coffee cake.

This object is achieved by the inventive apparatus being characterised in that the coffee receiving means comprises a sleeve-shaped body made of a resilient material, said body on the outside being supported by a substantially rigid supporting means and on the inside between the ends being of a volume exceeding the measured amount of coffee powder, and that during the feeding of water the piston device is adapted to simultaneously compress both the measured amount of coffee and the sleeve-shaped body in its axial direction, while the amount of coffee and the sleeve-shaped body at the opposite axial end are supported by a sieving means allowing passage of the brewed hot beverage.

As a result, an apparatus is obtained which comprises a coffee receiving means allowing an automatic removal of the used amount of coffee simultaneously with being of a relatively simple structure. This is due to the measured amount of coffee powder being compressed by both the piston device and the resilient sleeve shaped body. The compression of the sleeve-shaped body causes a decrease of its inner diameter while its outer diameter is kept constant by the surrounding supporting means. When the piston device is removed from its compressing engagement with the coffee and the sleeve-shaped body after the brewing of the beverage, the sleeve-shaped body returns to its original state while the coffee is left as a compressed cake. The cake has been compressed in all directions with the result that it is left lying freely atop the underlying sieving means without being retained by the sleeve shaped body and is ready to be removed.

According to a particularly advantageous embodiment of the invention the coffee receiving means may be displaceably arranged on a substantially horizontal supporting plate including the sieving means, the coffee receiving means being movable between a position in which the amount of coffee is received, a position in which the compression and the feeding of water are performed and a position in which the used amount of coffee can fall out of the coffee receiving means. As a result, the used coffee cake can be removed in a particularly easy and automatic manner.

Furthermore according to the invention the sieveing means may advantageously comprise a sieving plate and a sealing ring encircling said sieving plate and being adapted to sealingly engage the sleeve shaped body during the brewing, and the surface of the sieving plate and the sealing ring may flush with the horizontal supporting plate.

Moreover according to the invention the supporting means and the sleeve shaped body may be interconnected by means of a circumferential tongue-and-groove joint, whereby the sleeve-shaped body is retained in the supporting means in a simple manner.

Furthermore, according to the invention the supporting means may be a substantially sleeve-shaped length of pipe rotatably arranged around an axis of rotation situated outside its outer wall, said axis of rotation extending parallel to the axis of the sleeve-shaped body, whereby the displacement of the sleeve-shaped body between the various positions is achieved in a particularly simple manner.

According to the invention the piston device may comprise an outer non-resilient piston engaging the sleeve-shaped body and an inner spring-loaded piston engaging the measured amount of coffee. As a result, the piston device can operate in a completely satisfactory manner irrespective of variations in the measured amount of coffee, the inner spring-loaded piston adapting itself to said variations. Accordingly, different amounts of coffee powder require no adjustments.

According to the invention the inner spring-loaded piston may advantageoulsy comprise an inner cavity opening into the coffee engaging surface through a water distributing sieving plate, where the interior of said cavity is connected to a water feeding conduit through a radial channel, said water feeding conduit extending through a slot in the outer piston.

Further according to the invention the inner spring-loaded piston may be surrounded by a circumferential skirt permanently connected to the outer non-resilient piston and projecting axially beyond said non-resilient piston in the direction of the coffee receiving means, said skirt being adapted to project axially into the sleeve-shaped body and to abut an adjacent portion of said body during the brewing. An effective reinforcement of the sleeve-shaped body is thereby obtained during the compression within the area in which it is subjected to the piston device. At the same time the inner spring-loaded piston can engage the coffee without the compressed sleeve-shaped body interfering significantly with its movement.

Particularly advantageously the upper portion of the sleeve-shaped body engaging the skirt of the piston device may be of a larger internal sectional area than the lower portion surrounding the measured amount of coffee, a relatively short transition portion being placed between said upper and lower portions, where the inner surface of said transition portion narrows conically and is followed by the lower portion of a constant internal sectional area all the way down to the end surface engaging the sieving means in the supporting plate. In this manner an effective control is ensured of the area in which the compressed sleeve-shaped body engages the coffee due to a decrease of its inner diameter.

Finally according to the invention a check valve may be provided in the inner cavity of the spring-loaded piston. As a result, an effective limitation is obtained of the amount of water that might fall down and destroy the coffee cake after the brewing.

BRIEF DESCRIPTION OF THE DRAWINGS

The invention is described in greater details below with reference to the accompanying drawing in which.

DESCRIPTION OF THE PREFERRED EMBODIMENTS

Figure 1:
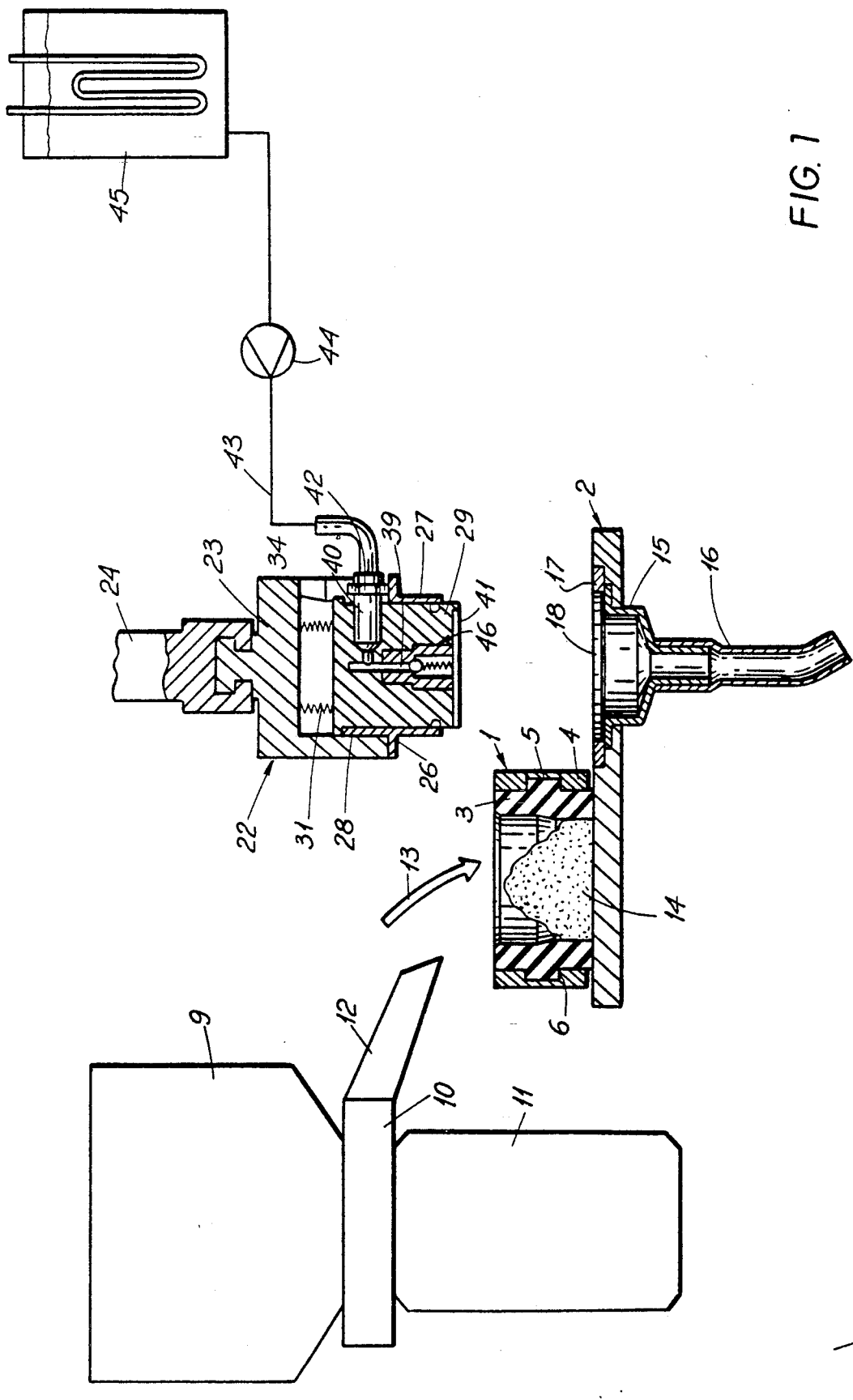
FIG. 1 is a diagrammatic, side view of an apparatus according to the invention, some of the parts thereof being shown in a vertical sectional view.

The apparatus of FIG. 1 comprises a coffee receiving means designated the general reference numeral 1 and displaceably abutting a supporting plate designated the general reference numeral 2. The coffee receiving means comprises a sleeve-shaped body 3 made of a resilient material, such as solid soft silicon rubber of a shore value of 20. The sleeve-shaped body 3 is retained along the outer periphery in a supporting means 4 by means of a circumferential outer tongue 5 received in a circumferential groove 6 in the supporting means 4.

Figure 2:
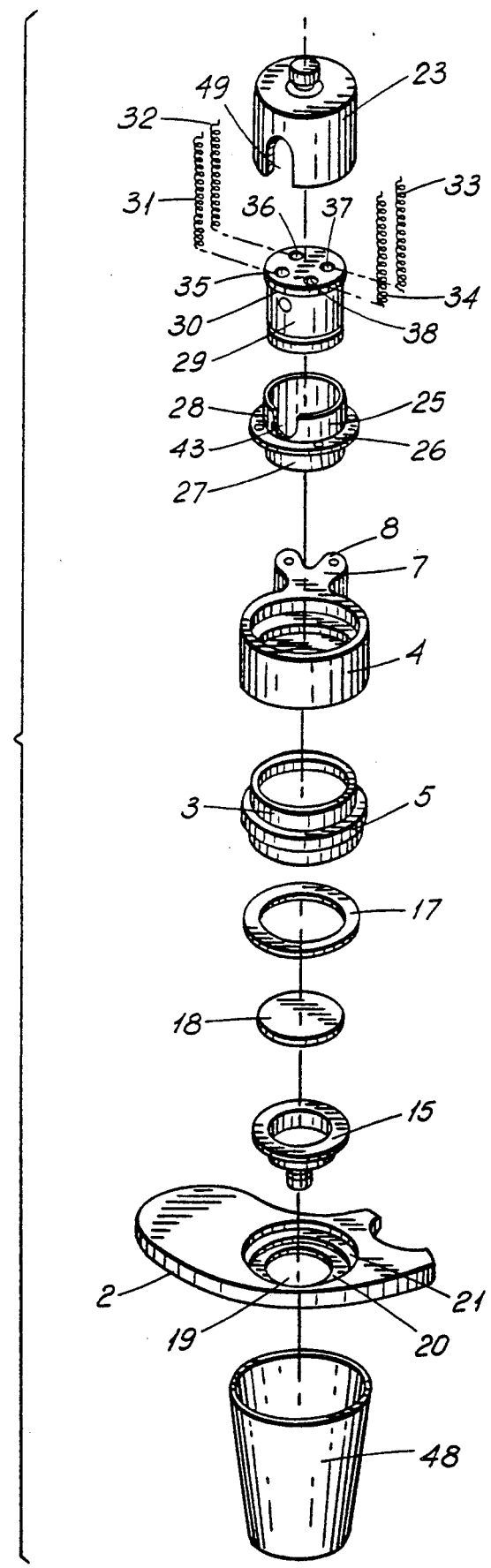
FIG. 2 is a perspective view of parts of the apparatus of FIG. 1, viz. a piston device, a coffee receiving device and a supporting plate placed over a cup, a few parts being separated for the sake of clarity.

The supporting means 4 is made of a suitably solid material, such as metal. As shown in FIG. 2, the supporting means 4 is present in form of a circumferential ring with a radially extending projection 7. The projection 7 comprises members 8 for the mounting of the ring on a driving shaft not shown, said shaft allowing a movement of the supporting means between three positions relative to the supporting plate 2. The three positions are described in greater detail below.

In FIG. 1, the supporting means 4 and the sleeve-shaped body 3 of the coffee receiving means are positioned immediately adjacent a coffee beans dispenser 9. The dispenser 9 is in a conventionally known manner adapted to dispense measured amounts of coffee beans to a coffee grinder 10 driven by a motor 11. After the grinding, the coffee powder is carried to the coffee receiving means 1 through a chute 12, cf. the arrow 13. A measured amount 14 of coffee powder is indicated inside the coffee receiving means in FIG. 1.

As illustrated both in FIGS. 1 and 2, the supporting plate 2 comprises a through opening, in which a funnel 15 is mounted, said funnel being connected to a discharge pipe 16. A circumferential sealing ring 17 surrounding a sieving plate 18 is arranged above and along the upper periphery of the funnel 16. The upper surface of both the sealing ring 17 and the sieving plate 18 flushes with the upper surface of the remaining portion of the supporting plate. The funnel 15, the sealing ring 17 and the sieving plate 18 are mounted in a through opening 19 in the supporting plate 2 by means of step-wise shaped, circumferential contact surfaces 20 and 21, respectively.

Figure 3:
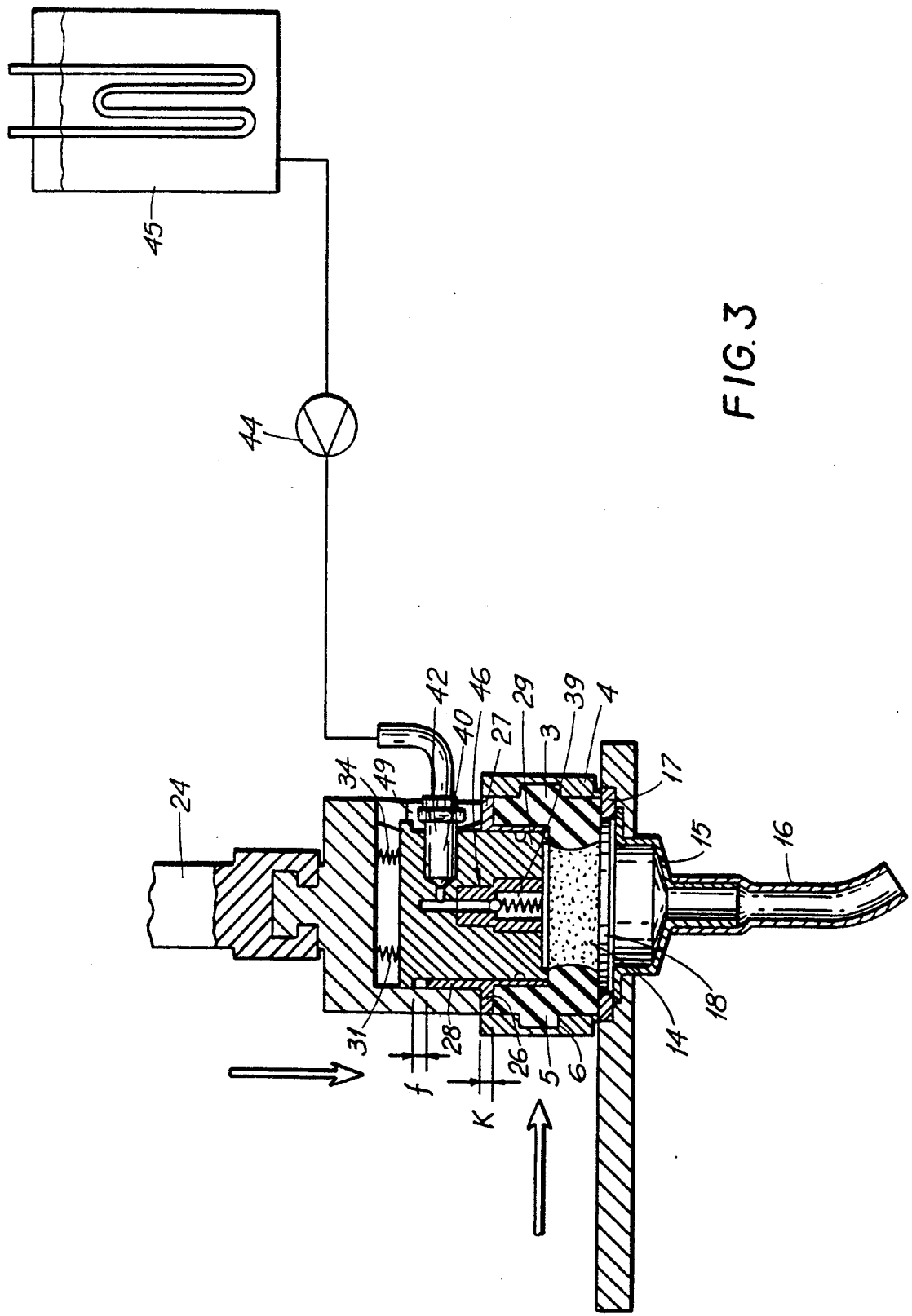
FIG. 3 is a sectional view of parts of the apparatus of FIG. 1 during the brewing of the coffee.

As illustrated inter alia in FIG. 3, the sealing ring 17 is of such an inner and outer diameter that it abuts the downward surface of the supporting means 4 of the coffee receiving means 1 as well as at least also a portion of the downward surface of the sleeve-shaped body 3 when the coffee receiving means 1 is forwardly displaced into a Position coaxially above the funnel 15.

A piston device designated the general reference numeral 22 is provided coaxially above the funnel 15 and consequently also above the opening 19 in the supporting plate 2. The piston device 22 comprises an outer cup-shaped non-resilient piston 23 upwardly secured on a piston rod 24 when seen relative to the drawing. The piston rod 24 is connected in a manner not described in greater detail to a driving device through for instance a crank mechanism or a spindle.

The orifice of the outer non-resilient cup-shaped piston 23 faces downwards towards the supporting plate 2, a tubular body 25 being secured in said orifice. The tubular body 25 comprises a circumferential outer flange 26 abutting the downward side of the non-resilient cup-shaped piston 23, said tubular body 25 being screwed to the non-resilient piston 23 by means of screws through holes in the flange 26. The tubular body 25 forms a downward skirt 27 projecting beyond the non-resilient piston 23 as well as an inward length of tube 28 ending a predetermined distance from the bottom of the cup-shaped recess in the non-resilient piston 23.

The tubular body 25 is used inter alia for securing an inner piston 29 inside the non-resilient piston 23. The inner piston 29 is made of a plastic material, such as nylon, of a relatively low specific heat and being of a circular outer cross section. At each end the inner piston is defined by a plane radial surface, the inner surface of which situated in the interior of the non-resilient piston 23 is adjacent to a circumferential flange 30. The circumferential flange 30 cooperates with the inward length of tube 28 of the tubular body 25 in determining the maximally extended position of the inner piston. Four springs 31–34 are provided between the inner piston 29 and the bottom of the non-resilient piston 23, said four springs being received in their respective opening 35, 36, 37 and 38 in the inner end of the inner piston 29. The four springs abut the bottom of the non-resilient piston 23 and are provided with a total tension of approximately 30 kp.

The inner piston 29 comprises an inner cavity 39 opening into the radially outer surface of the inner piston 29 and being connected to a radially extending channel 40, which at the inner end of the inner piston 29 extends to the outer side of the inner piston 29. The radial channel 40 is connected to a pipe coupling 42 projecting through a slot 43 in the side of the inward length of tube 28 of the tubular body 25 as well as through a slot 49 in the outer non-resilient piston 23. The pipe coupling 42 is connected to a hot water reservoir 45 through a conduit 43 and a pump 44. The hot water in the reservoir is kept at a temperature of approximately 97° C.

A water distributing sieving plate 41 is mounted on the radial outer side of the inner piston 29, said sieving plate covering the orifice of the cavity 39 and being secured to the inner piston 29 in any suitable manner (not shown).

A predetermined signal causes the pump 44 to feed a measured amount of hot water under a pressure of from 6 to 12 bar to the piston device 22. Subsequently, the measured amount of hot water continues through the sieving plate 41 of the inner piston 29, said sieving plate distributing the water across its entire outer surface. A check valve designated the general reference numeral 46 is mounted in the orifice of the inner cavity 39, said check valve being adapted to block the passage of the water to the sieving plate 41 when the pump 44 is not operating.

By the apparatus according to the invention, the coffee receiving means is moved to a position below the outlet of the chute 12 from the grinder 10. In this position the coffee receiving means is adapted to receive a measured amount of ground coffee 14, cf. FIG. 1. From this position, the coffee receiving means 1 is moved into a position coaxially below the piston device 22 atop the sealing ring 17 and the sieving plate 18 in the supporting plate 2. Now the piston device 22 is activated to move towards the coffee receiving means 1 with the result that the downward skirt 27 of the piston device 22 slides downwards along the inner side of the sleeve-shaped body 3 in the coffee receiving means 1, and furthermore with the result that the adjacent flange 26 on the skirt 27 abuts the adjacent upper surface of the sleeve-shaped body 3, cf. FIG. 3.

As illustrated in FIG. 3, the non-resilient piston 23 and the flange 26 fixedly arranged thereon are of an outer diameter slightly smaller than the inner diameter of the supporting means 4. The stroke of the piston device has simultaneously been adjusted such that the sleeve-shaped body 3 is compressed a predetermined distance k.

A comparison of FIGS. 1 and 3 shows furthermore that the sleeve-shaped body 3 in the unloaded state is of a large inner sectional area corresponding to the outer sectional area of the skirt 27 within an axial length, said axial length in turn corresponding to the axial length of the skirt. At the end adjacent the supporting plate, the sleeve-shaped body 3 is of a small sectional area, said end being connected to the end of the large sectional area through a conically extending short portion.

While the non-resilient piston 22 subjects the sleeve-shaped body 3 to a compression, the inner spring-loaded piston 29 subjects the coffee, i.e. the coffee powder, to a compression simultaneously with being displaced a distance f backwards relative to the outer piston 22, said distance f corresponding to the amount of coffee. The distance f depends on the relevant amount of coffee, said amount usually varying between 4 to 8 g of coffee. The surrounding dimensions both with respect to the inner diameter of the adjacent portion of the sleeve-shaped body 3 and the outer diameter of the inner piston 29 as well as the stroke of the piston device 22 are adjusted such that the coffee is subjected to a suitable compression from all sides, cf. FIG. 4, irrespective of variations in the amount of coffee.

The compression of the sleeve-shaped body 3 and the presence of the supporting means and the skirt 27 cause an inward expansion of the sleeve-shaped body 3 towards the coffee powder, cf. FIG. 3. At the same time a tightly sealing connection is provided between the sleeve-shaped body 3 and the sealing ring 17 in the supporting plate 2.

When the coffee powder has been compressed, the pump 44 is caused to press water through the coffee powder and downwards into the funnel 15 through the sieving plate 18. When leaving the funnel 15, the ready coffee is dispensed to a cup 48 through discharge conduits 16, said cup 48 only appearing from FIG. 2. As mentioned, the pressure of the pump 44 causes an opening of the check valve 46, and when the desired amount of water has passed through the coffee powder 14, the pump 44 is automatically interrupted simultaneously with the check valve 46 blocking the passage. The presence of the check valve ensures that additional water does not flow into the coffee powder by a mistake once the pump 44 has been interrupted.

The pressure of the water causes the inner piston 29 to retract 2 to 4 mm from the compressed coffee cake with the result that a water cushion is formed atop said coffee cake. In this manner a uniform utilization of the coffee is achieved.

Figure 4:
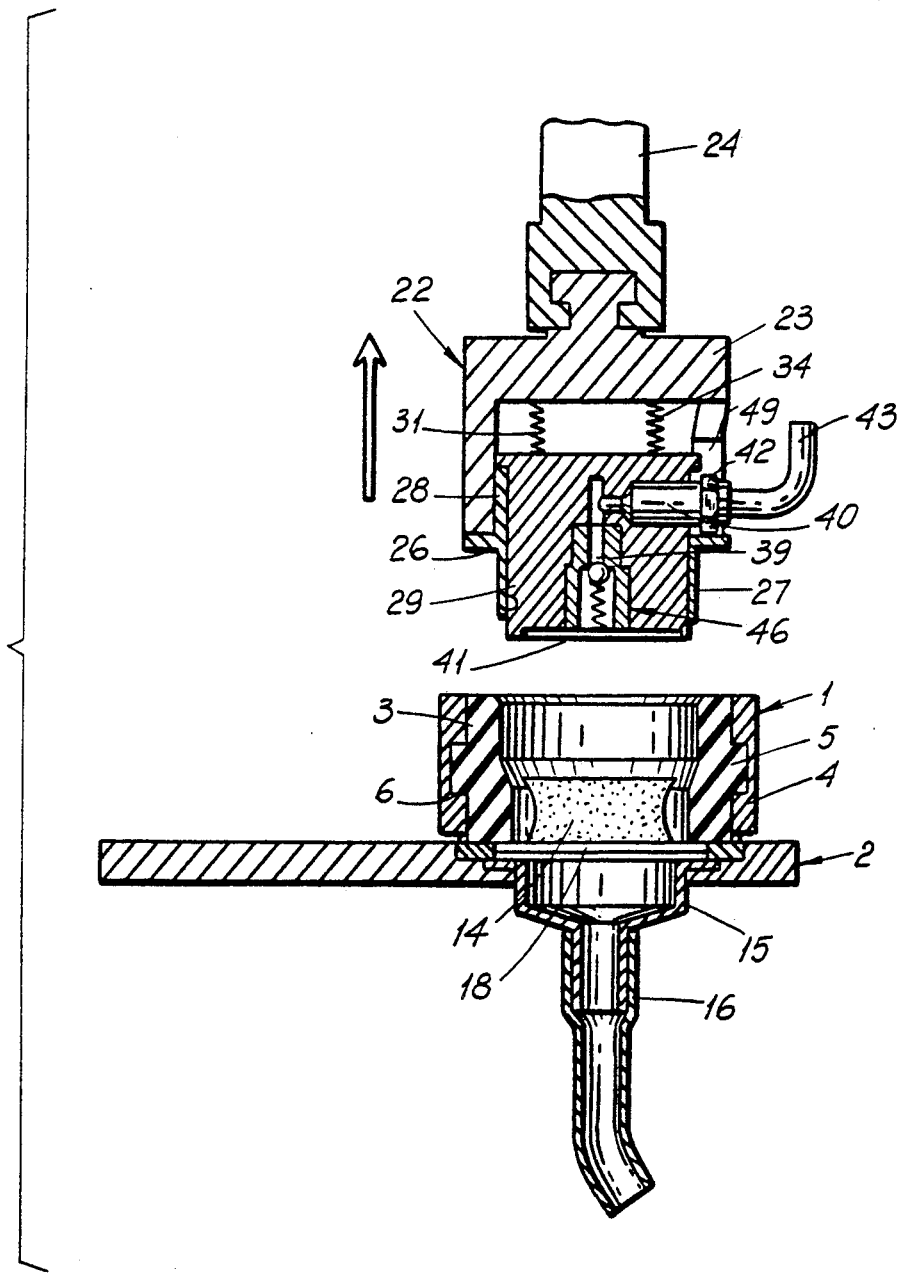
FIG. 4 corresponds to FIG. 3, but after the brewing of coffee.
Figure 5:
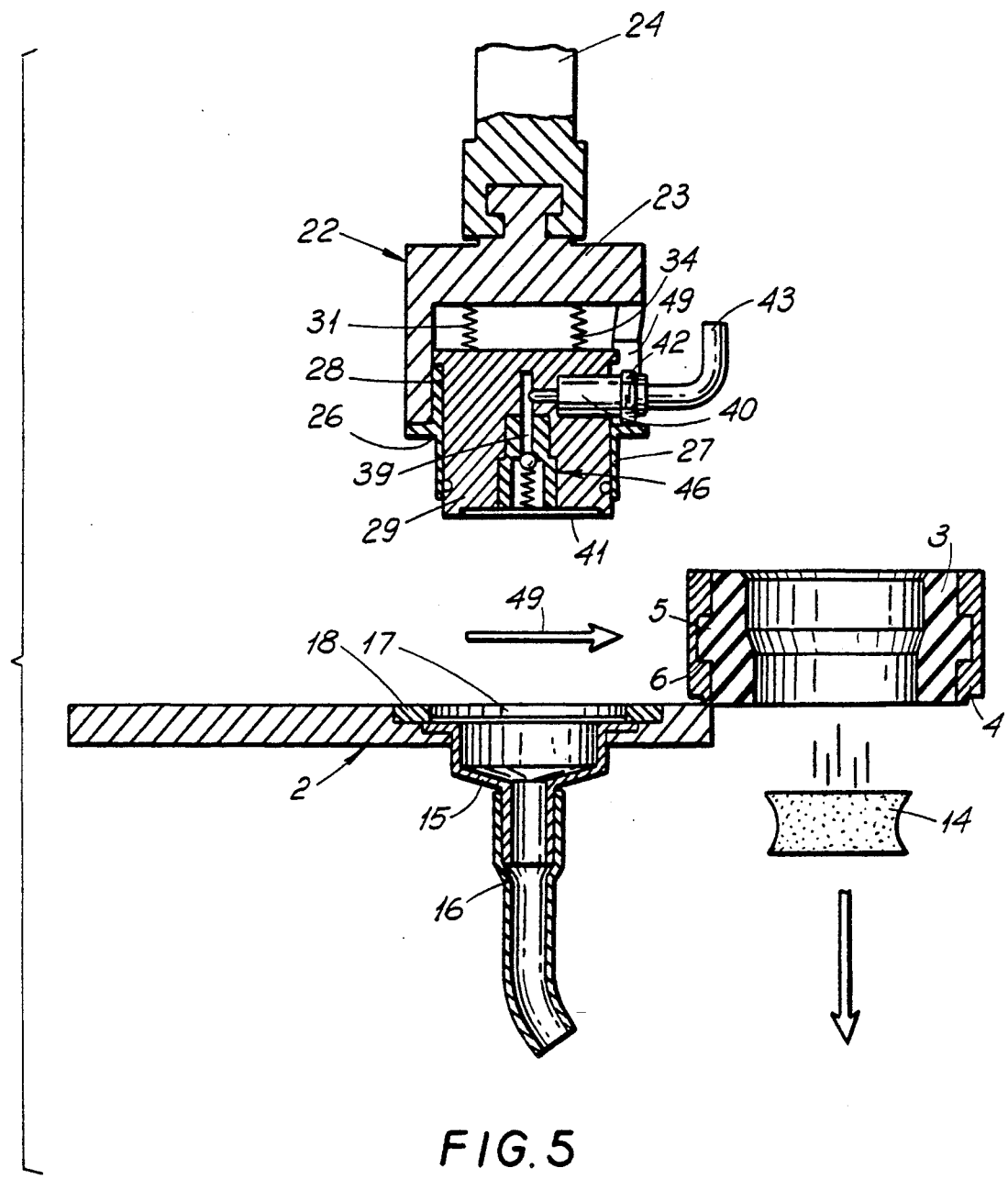
FIG. 5 corresponds to FIG. 3, but showing the removal of a compressed coffee cake.

When the coffee is ready, the piston device is retracted, cf. FIG. 4, with the result that the sleeve-shaped body 3 returns to its original state due to its elasticity and leaves the coffee as a cake centrally placed atop the sieving plate 18 in the supporting plate 2. Subsequently, the coffee receiving means 1 is caused to move in the direction indicated by an arrow 49 in FIG. 5 and to enter a position outside the area of the supporting plate 2, whereby the coffee cake 14 can fall freely into a collecting container not shown. Now the coffee receiving means 1 is returned to the position immediately adjacent the coffee grinder 10 and is ready to receive a fresh amount of coffee powder.

The apparatus forms usually part of a vending machine, where the parts of said vending machine are activated in the described sequence by means of suitable driving means.

The invention has been described with reference to a preferred embodiment. Many modifications may, however, be carried out without thereby deviating from the scope of the invention. The sleeve-shaped body 3 may for instance be a silicon ring filled with liquid. The check valve 46 may be adapted to be actuated by the pressure arising during the compression of the coffee instead of being actuated by the water pressure.

Figure 6:
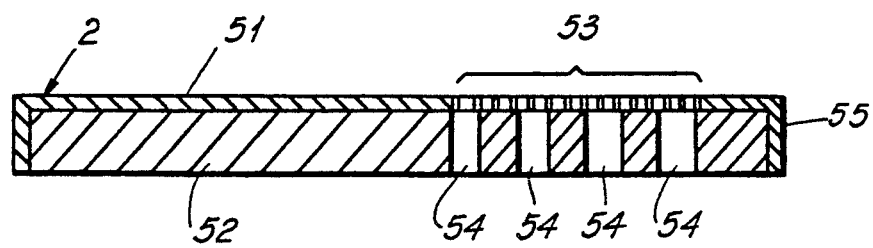
FIG. 6 is a vertical, cross-sectional view of a second embodiment of a supporting plate to be used in the apparatus according to the invention.

Finally, the supporting plate 2 may comprise a thin stainless metal plate 51 diagrammatically illustrated in FIG. 6. The metal plate is secured to a thick reinforcing plate 52, and together these two parts are of substantially the same outer contour as the embodiment of the supporting plate 2 of FIG. 2. In the present case, the sieving means is formed by a perforated area 53 in the thin metal plate 51 and a plurality of passages 54 in the thick reinforcing plate 52. The thin metal plate 51 is secured to the thick reinforcing plate 52 through a bead 55 along the outer rim as well as suitable securing means not shown, such as glue or clips.

The thin metal plate 51 is preferably a 0.2 to 0.3 mm thick metal sheet and provides together with the sleeve-shaped body 3 a sufficient sealing with the result that additional sealing means are not necessary. The thick reinforcing plate 52 is preferably made of injection moulded plastics.

I claim:

1. Apparatus for brewing beverages in portions, especially espresso coffee and preferably for use in vending machines, said apparatus comprising means for dispensing a measured amount of ground coffee beans to a coffee receiving means as well as water feeding means combined with a piston device for compressing the coffee while hot water is simultaneously passing through the coffee in the coffee receiving means, the ready beverage being fed to a cup, wherein the coffee receiving means (1) comprises a sleeve-shaped body (3) made of a resilient material, said body on the outside being supported by a substantially rigid supporting means (4) and on the inside between the ends being of a volume exceeding the measured amount of coffee powder, and wherein during the feeding of water the piston device (22) is adapted to simultaneously compress both the measured amount of coffee (14) and the sleeve-shaped body (3) in its axial direction, while the amount of coffee (14) and the sleeve-shaped body (3) at the opposite axial end are supported by a sieving means (17, 18) allowing passage of the brewed hot beverage.

2. Apparatus as in claim 1, wherein the coffee receiving means (1) is displaceably arranged on a substantially horizontal supporting plate (2) including the sieving means (17, 18), the coffee receiving means (1) being movable between a position in which the amount of coffee (14) is received, a position in which the compression and the feeding of water are performed and a position in which the used amount of coffee (14) can fall out of the coffee receiving means (1).

3. Apparatus as in claim 1, wherein the sieving means (17,18) comprises a sieving plate (18) and a sealing ring (17) encircling said sieving plate and being adapted to sealingly engage the sleeve-shaped body (3) during the brewing, and wherein the surface of the sieving plate (18) and the sealing ring (17) flush with the horizontal supporting plate (2).

4. Apparatus as in claim 1, wherein the supporting means (4) and the sleeve-shaped body (3) are interconnected by means of a circumferential tongue-and-groove joint (5, 6).

5. Apparatus as in claim 1, wherein the supporting means (4) is a substantially sleeve-shaped length of pipe and support means supporting the pipe for rotation around an axis of rotation outside an outer wall of the pipe, said axis of rotation extending parallel to the axis of the sleeve-shaped body.

6. Apparatus as in claim 1, wherein the piston device (22) comprises an outer non-resilient piston (23) engaging the sleeve-shaped body (3) and an inner spring-loaded piston (29) engaging the measured amount of coffee (14).

7. Apparatus as in claim 6, wherein the inner spring-loaded piston (29) comprises an inner cavity (39), opening into the coffee engaging surface through a water distributing sieving plate (41), where the interior of said cavity is connected to a water feeding conduit (43) through a radial channel (40), said water feeding conduit extending through a slot in the outer piston.

8. Apparatus as in claim 6, wherein the inner spring-loaded piston (29) is surrounded by a circumferential skirt (27) permanently connected to the outer non-resilient piston (23) and projecting axially beyond said non-resilient piston in the direction of the coffee receiving means (1), said skirt being adapted to project axially into the sleeve-shaped body (3) and to abut an adjacent portion of said body during the brewing.

9. Apparatus as in claim 8, wherein the upper portion of the sleeve-shaped body (3) engaging the skirt (27) of the piston device (22) is of a larger internal sectional area than the lower portion surrounding the measured amount of coffee (14), a relatively short transition portion being placed between said upper and lower portions, where the inner surface of said transition portion narrows conically and is followed by the lower portion of a constant internal sectional area all the way down to the end surface engaging the sieving means in the supporting plate (2).

10. Apparatus as in claim 7, wherein a check valve (47) is provided in the inner cavity (39) of the spring-loaded piston (29).

11. Apparatus as in claim 2, wherein the supporting plate (2) comprises an integrally formed thin stainless metal plate (51) which covers the entire upper surface of the supporting plate (2), and wherein the sieving means is formed in said metal plate (51) in the form of a perforation (53) within a limited area, said stainless metal plate (51) being supported by a thick reinforcing plate (52) with a plurality of through apertures placed opposite the perforation area (53) of the thin metal plate (51).

12. Apparatus for brewing a portion of coffee, comprising:
a sleeve-shaped resilient body having an inside between axially opposite ends for receiving a quantity of ground coffee beans sufficient for brewing a portion of coffee and an outside;
supporting means for substantially rigid support of the outside of the sleeve-shaped resilient body;
water means for supplying effective and sufficient water to the inside the sleeve-shaped resilient body while the quantity of ground coffee beans is received therein for the brewing of the portion of coffee therefrom;
piston means for simultaneously compressing the sleeve-shaped resilient body axially and the quantity of ground coffee beans while the water is supplied thereto; and
sieve means at one of the ends of the sleeve-shaped resilient body for supporting the quantity of ground coffee beans in the sleeve-shaped resilient body and letting out the brewed portion of coffee.

13. The apparatus of claim 12,
wherein the piston means axially compresses the sleeve-shaped resilient body sufficiently in relation to the resilience thereof and the rigidity of the supporting means for expanding the sleeve-shaped resilient body radially into the inside thereof, thereby radially compressing the quantity of ground coffee beans, and then uncompresses the same; and
further comprising removing means for moving the sleeve-shaped resilient body to a position for the radially compressed quantity of the ground coffee beans to fall out of one of the ends of the sleeve-shaped resilient body.

* * * * *